(12) United States Patent
Shigeno et al.

(10) Patent No.: US 6,464,577 B2
(45) Date of Patent: Oct. 15, 2002

(54) PROCESS FOR MANUFACTURING A REGISTER FOR VENTILATING AIR

(75) Inventors: Kazumichi Shigeno, Ichinomiya; Shigeru Yabuya, Inuyama; Akira Azumi, Kakamigahara; Shigenori Shibata, Nakashima-gun, all of (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 09/977,255

(22) Filed: Oct. 16, 2001

(65) Prior Publication Data

US 2002/0028651 A1 Mar. 7, 2002

Related U.S. Application Data

(63) Continuation-in-part of application No. 09/650,845, filed on Aug. 29, 2000.

(30) Foreign Application Priority Data

Sep. 29, 1999 (JP) .............................. 11-276116

(51) Int. Cl.$^7$ ............................. B60H 1/34; B29C 45/26
(52) U.S. Cl. ....................... 454/155; 264/257; 264/266; 264/274
(58) Field of Search ................................ 454/155, 314, 454/315, 316, 319, 320, 321; 264/257, 266, 274

(56) References Cited

U.S. PATENT DOCUMENTS 5,741,179 A    4/1998  Sun et al. .................... 454/155
6,059,652 A    5/2000  Terry et al. .................. 454/155
6,059,653 A    5/2000  Gehring et al. .............. 454/155

OTHER PUBLICATIONS

Japanese Unexamined Utility Model Publication (KOKAI) No. 8–118427.

Japanese Unexamined Utility Model Publication (KOKAI) No. 9–52251.

Japanese Unexamined Utility Model Publication (KOKAI) No. 9–175162.

Japanese Unexamined Utility Model Publication (KOKAI) No. 10–258633.

*Primary Examiner*—Harold Joyce
(74) *Attorney, Agent, or Firm*—Pillsbury Winthrop LLP Intellectual Property Group (57) ABSTRACT

A process for manufacturing a register for ventilating air includes molding a deflector member having a plurality of shafts and a plurality of first deflector plates. The deflector member is made from a first resin. A connector member, which holds the plurality of shafts rotatably and connects the first deflector plates swingably, is molded from a second resin that possess characteristics that prohibit it from fusing with the first resin. Next, a frame-shaped member, made from a third resin and having a plurality of second deflector plates, is molded by the process. Then, the deflector member, which includes the connector member, is assembled with the frame-shaped member. A knob for operating the first deflector plates can be molded integrally with one of the first deflector plates.

5 Claims, 7 Drawing Sheets

PROCESS FOR MANUFACTURING A REGISTER FOR VENTILATING AIR

CROSS REFERENCE TO RELATED APPLICATIONS

This application is a continuation-in-part of U.S. application Ser. No. 09/650,845, filed Aug. 29, 2000 the entire contents of which are herein incorporated by reference.

BACKGROUND OF THE INVENTION

1. Field of the Invention

The present invention relates to a process for manufacturing a register for ventilating air. More particularly, it relates to a process for manufacturing a register in which a plurality of deflector plates are swingably held in a frame-shaped barrel.

2 Description of the Related Art

In a conventional heating/cooling system in an automobile, air is led from a furnace or air-conditioning unit through ducts to outlet openings in the interior of the vehicle. The outlet openings are usually covered by grills or registers.

Conventional registers are typically made from a two-color molding process. This two-color molding process was developed in consideration of the physical properties of the register or based on the design requirement that a plurality of resins are needed to manufacturer the register. In this two-color molding process, a first molded member is molded by first injecting a first resin into a first cavity. Then, a second molded member is molded by injecting a second resin into a second cavity neighboring the first cavity. Thus, an integrally molded two-color article is formed which comprises the first molded member and the second molded member.

Figure 10:
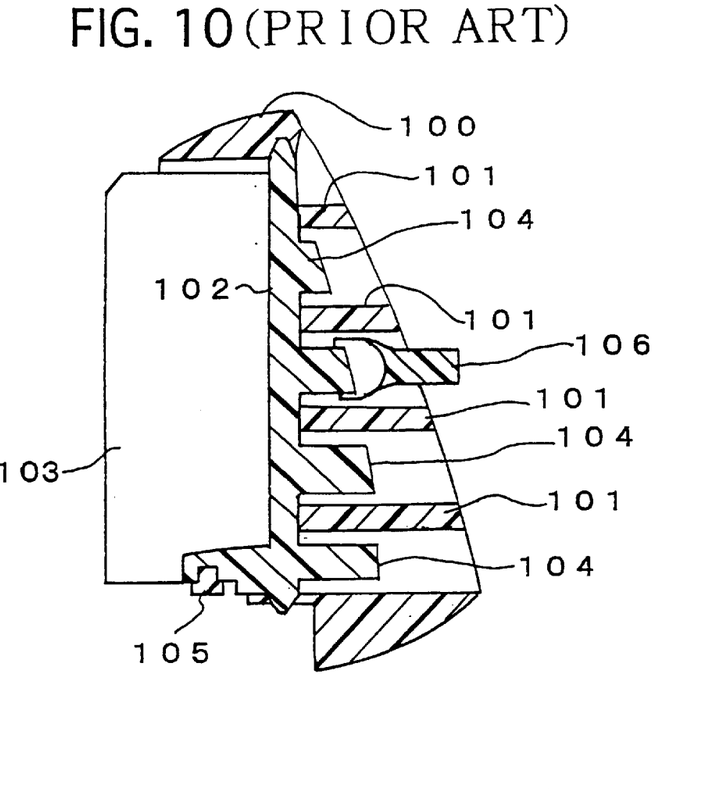
FIG. 10 is a cross-sectional view illustrating a register which is molded by a conventional manufacturing process.

The conventional register, illustrated in FIG. 10, can be used, for example, in an air-conditioning unit installed in an automobile. As shown in FIG. 10. the register is provided with a frame-shaped barrel 100, a plurality of shafts 102, a plurality of rearward vertical deflector plates 103 a plurality of forward vertical deflector plates 104, a connector rod 105 and a knob 106. The barrel 100 has a plurality of horizontal deflector plates 101, which form outlet openings and which are parallel with each other. The shafts 102 are disposed in the rear of the horizontal deflector plates 101, which are held rotatably by the barrel 100, and the shafts 102 are disposed parallel with each other. Each of the rear vertical deflector plates 103 projects rearward from each of the shafts 102. Each of the forward vertical deflector plates 104 projects forward from the shafts 102 and is positioned between the horizontal deflector plates 101. The rod 105 holds the rearward vertical deflector plates 103 swingably and connects the rearward vertical deflector plates 103 to the shafts 102. The knob 106 is held by the central forward vertical deflector plate 104.

In this conventional register, each of the shafts 102 is held swingably by the barrel 100, and the rearward vertical deflector plates 103 and the forward vertical deflector plates 104 can swing synchronously with each other by being hingedly connected to the connector rod 105. Accordingly, by pinching the knob 106 so as to swing in the left and right directions, the wind direction of the ventilating air can be deflected in the left and right directions. Moreover, when the barrel 100 is mounted into an outlet of an air-conditioning apparatus in an instrument panel, the wind direction of the ventilating, air can be deflected in the up and down directions based upon the angle of the horizontal deflector plates 101. The passengers of the vehicle can adjust the amount of air circulated through the register by pivoting the barrel 100, which in turn adjusts the deflection angle of the horizontal deflector plates 101.

Figure 11:
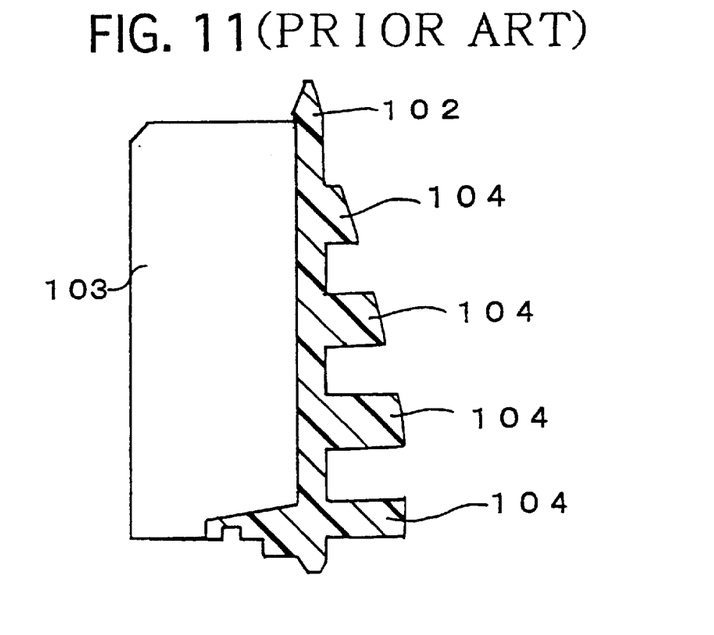
FIG. 11 is a cross-sectional view illustrating a member which is molded during an intermediate stage of the conventional manufacturing process.

When manufacturing such a register, the shafts 102, the rearward vertical deflector plates 103 and the forward vertical deflector plates 104 are initially molded from a first resin, having a high melting point, as illustrated in FIG. 11. Then, a portion of a slide core is changed within the original molding cavity. While the shafts 102, the rearward vertical deflector plates 103 and the forward vertical deflector plates 104 remain in the original molding cavity, the barrel 100 and the connector rod 105 are formed in a second molding cavity and are molded from a second resin which exhibits a lower melting point than the first resin. The characteristics of the second resin do not permit it to fuse with the first resin. Thus, the second resin is free from welding to the first resin. Finally, the knob 106 is installed to complete the register.

In the conventional air-conditioning register, depicted in FIG. 10, there can be some design situations where the bottom of the barrel 100 is thickened during the molding process. However, when such a thickened portion exists in the injection molding of a frame-shaped member like the barrel 100, a drawback arises in that a concave sink mark may occur at the thickened portion and in that the thickened portion may deform due to warpage. When such a drawback arises, there is a chance that the appearance of the register may be impaired, and additionally, the thickened portion may interfere with the movement of the forward vertical deflector plates 104 to deteriorate their operation.

When the manufacturer integrally molds the knob 106 to the shafts 102, the resulting molded member, which includes the knob 106 and the shifts, may experience difficulties due to deficiencies of the barrel 100. There may arise a problem in that the mold for forming the barrel 100 is so thinned out due to the uneven distribution of the resin that the strength of the mold weakens. Accordingly, it is necessary to make the knob 106 as an independent component part. Hence, there may arise another problem in that as the number of the component parts increases, so do the number of man-hours required to assemble the device.

Further, in view the strength of the mold when molding the barrel 100, there may arise an additional problem in that the configuration of the forward vertical deflector plates 104 may be limited so that the directivity of the blowing air decreases.

Furthermore, in view of the insertability of the shafts 102 in the molding of the barrel 100, it is necessary to provide clearances at the holding portions, which may create an unstable and rickety device.

SUMMARY OF THE INVENTION

The present invention has been developed in view of the aforementioned shortcomings. It is therefore an object of the present invention to provide a register in which inhibits the formation of a sink mark at the thickened portion, which allows arbitrary designing, which heightens the degree of freedom in molding, and which allows a manufacturer to integrally mold the knob.

A process for manufacturing a register according to the present invention can be carried out by employing a first mold half having a first cavity and a second cavity, a second mold half having a third cavity and a third mold half having a fourth cavity and a fifth cavity. The first cavity and the third cavity constitute a first die, the first cavity and the fourth cavity constitute a second die, and the second cavity and the fifth cavity constitute a third die. The process includes molding a deflector member made from a first resin in the first die after clamping the first mold half and the second mold half, the deflector member having a plurality of shafts and a plurality of first deflector plates extending from each of the shafts substantially parallel with each other, molding a connector member made from a second resin that does not fuse with the first resin in the second die after clamping the first mold half and the third mold half and maintaining the deflector member in the first cavity, the connector member holding the shafts rotatably and connecting the first deflector plates swingably; molding a frame-shaped member made from a third resin in the third die, the frame-shaped member having a plurality of second deflector plates forming outlet openings, being substantially parallel with each other and crossing with the first deflector plates substantially perpendicularly; and assembling the deflector member having the connector member with the frame-shaped member.

By the manufacturing process according to the present invention, it is possible to manufacture a register at a reduced cost, a register which is aesthetically pleasing, and a register having improved operability qualities and enhanced directivity abilities that control the directions of the ventilating air.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of disclosure.

DETAILED DESCRIPTION OF EXEMPLARY EMBODIMENTS

In a manufacturing process according to the present invention, a connector member and a frame-shaped member are molded independently of each other. Accordingly, even when the frame-shaped member is designed so that it has a partially thickened portion, the thickened portion can be divided between the connector member and the frame-shaped member into two thickened portions, and the divided thickened portions can be molded independently of each other. As a result, the thickness of the thickened portions can be thinned out for each molding operation. With this arrangement, it is possible to inhibit the sink mark or the warpage, which results from the contraction after the molding, in order to improve the decorativeness and to keep the thickened portion from interfering with the forward vertical deflector plates. Thus, it is possible to manufacture a register that possesses components that operates smoothly under the guidance of a user's touch.

Further, since the frame-shaped member itself is molded in the second step of the molding process, the configuration of the deflector member having the shafts and the configuration of the connector member are not limited by the mold used to form the frame-shaped member. Accordingly, it is possible to integrally form the knob when the deflector member is formed. This reduces the number of component parts of the device, which in turn reduces the number of man-hours needed to assemble the device. Furthermore, the designer has a greater degree of freedom in designing the device. Moreover, the directivity of the ventilating air that blows past the deflector plates is enhanced by enlarging the swinging angle of the first deflector plates. In addition, since the clearances at the holding portions can be obviated, the unstableness and ricketiness of the device call be avoided.

In the first molding step, the deflector member is molded having a plurality of the shafts and a plurality of the first deflector plates which extend from each of the shafts and extend therefrom substantially parallel with each other. The selection of the first resin is not limited only to a thermoplastic resin. For example, it is possible to select at least one member from the group consisting of polypropylene, polyethylene, polyamide, PET, polyester and ABS. In the first molding step, it is preferred that a knob is molded integrally with one of the first deflector plates. With this arrangement, it is possible to obviate assembling the knob in a subsequent manufacturing step. Thus, the present manufacturing process can reduce the man-hour requirement for assembling the knob.

Furthermore, in the first molding step, the connector member, which holds each of the shafts rotatably and which connects the first deflector plates swingably, is molded. As for the second resin, in a case where the connector member is molded after the deflector member, a thermoplastic resin is used which does not fuse with the first resin and which possesses a lower melting point than that of the first resin.

In the case of manufacturing a register which has a thickened portion in the frame-shaped member, it is preferred that the thickened portion is divided into two parts in a thickness-wise direction, and that one of the thickened portions is molded so as to constitute a part of the connector member. With this arrangement, it is possible to inhibit the sink mark and the deformation in the thickened portion.

In the first molding step, the order of the molding of the deflector member and the molding of the connector member is not limited in particular.

In the second molding step, the frame-shaped member is molded by using a third resin. The frame-shaped member consists of a plurality of the second deflector plates which form the outlet openings, which are substantially parallel with each other, and which cross substantially perpendicularly with the first deflector plates. As for the selection of the third resin, it also is not limited. It is possible to select the third resin from the thermoplastic resins exemplified above.

The molding of the frame-shaped member can be carried out simultaneously with the molding of the connector member. For instance, a mold having two cavities can be used. One of the cavities can be used for molding the deflector member and the connector member. The other cavity can be used to mold the frame-shaped member. First, only the deflector member is molded. Then, the connector member is molded onto the molded deflector member, and simultaneously therewith the frame-shaped member is molded. Thus the man-hour requirements for molding the members can be reduced. As a result, the molding cycle time (i.e., the time it takes to manufacture one unit) is decreased, thus increasing overall productivity.

In the third assembling step, the deflector member having the connector member is assembled with the frame-shaped member. This step can be carried out manually. However, it is preferred that, when these components are removed from the mold, they are automatically assembled by utilizing a pneumatic pressure, such as an air pressure, so that the third assembling step is carried out within the molding cycle.

Figure 1:
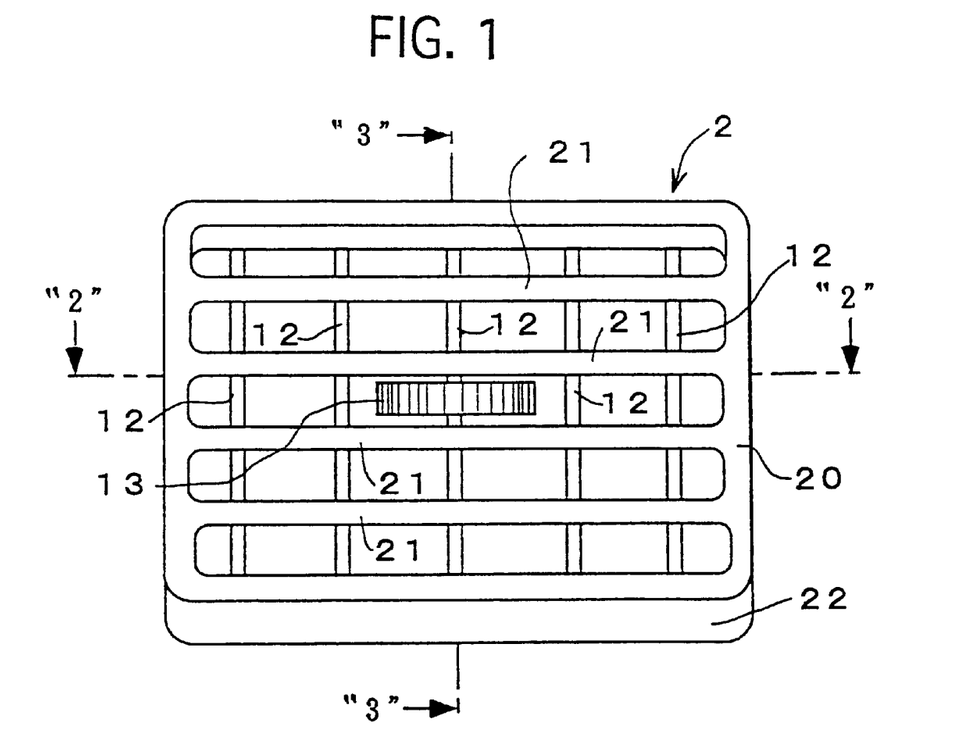
FIG. 1 is a front view illustrating a register manufactured according to the present invention.
Figure 2:
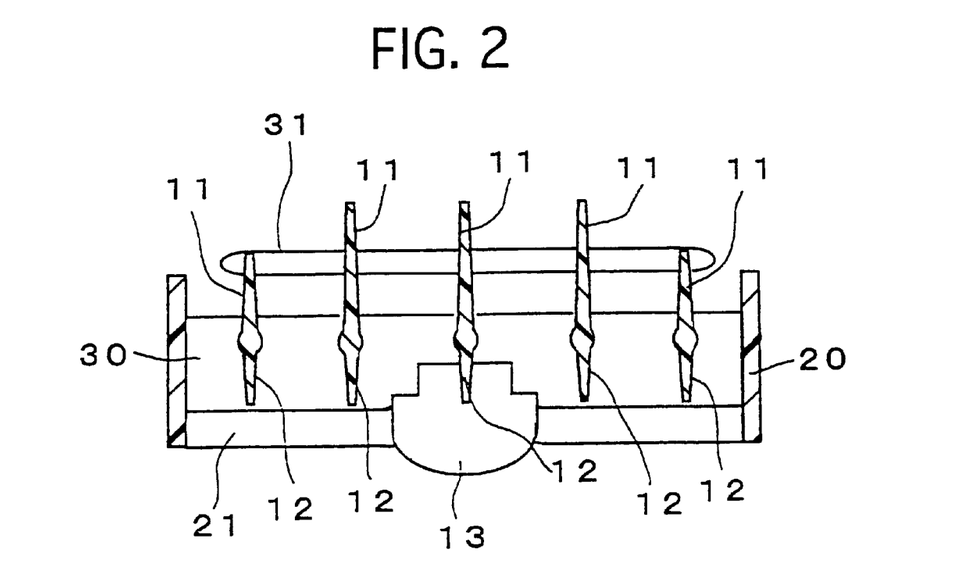
FIG. 2 is a cross-sectional view taken in the direction of line "2"—"2" of FIG. 1.
Figure 3:
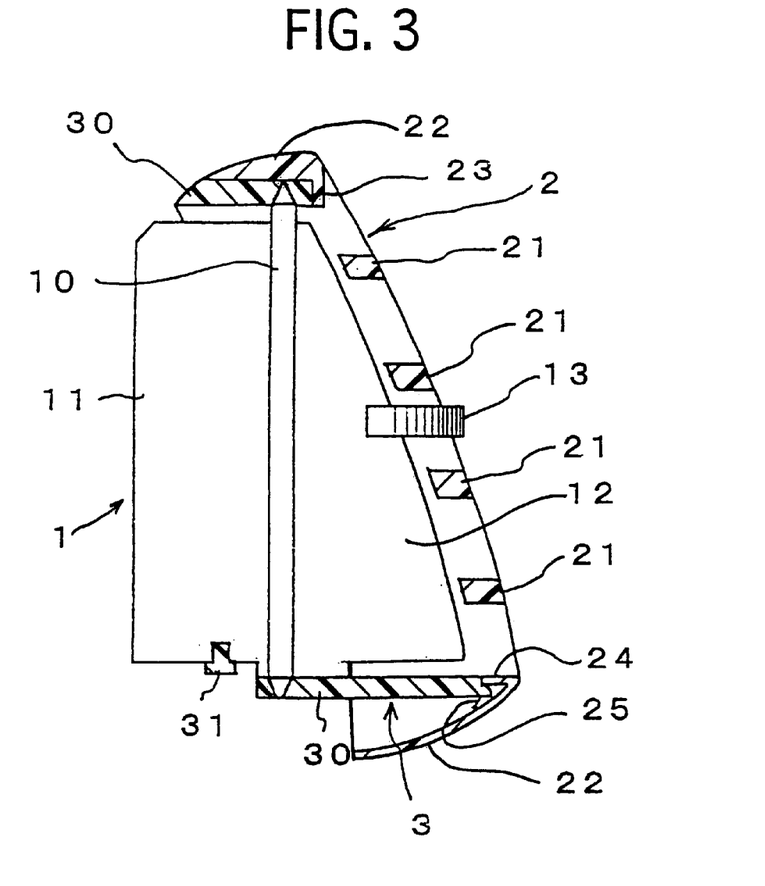
FIG. 3 is a cross-sectional view taken in the direction of line "3"—"3" of FIG. 1.

Hereinafter, the present invention will be described with reference to an example. FIGS. 1 through 3 illustrate a register, for example, for use within an air-conditioning unit. The register is obtained by employing a manufacturing process according to the present invention. This air-conditioning register comprises a deflector member 1, a barrel 2, working as the frame-shaped member and a connector member 3, interposed between the deflector member 1 and the barrel 2.

The deflector member 1 includes a plurality of shafts 10, extending in the vertical direction, a plurality of plate-shaped rearward vertical deflector plates 11, projecting from each of the shafts 10, a plurality of plate-shaped forward vertical deflector plates 12, projecting from each of the shafts 10 in the direction opposite to the rearward vertical deflector plates 11, and a knob 13, disposed on the central forward vertical deflector plate 12. In the barrel 2, the shafts 10 are disposed at intervals in the horizontal direction. The rearward vertical deflector plates 11 and the forward vertical deflector plates 12 are disposed in series so that they are substantially parallel with each other.

The barrel 2 includes a frame 20, forming outlet openings, and a plurality of horizontal deflector plates 21, bridging both of the left and right walls and being substantially parallel with each other. On the top and bottom of the frame 20, there are formed thickened portions 22, which are regarded as thick walls when viewed from the front.

The connector member 3 includes shaft holding portions 30, holding the opposite ends of the shafts 10 of the deflector member 1 rotatably and paired in the vertical direction, and a connector rod 31, holding each of the rearward vertical deflector plates 11 swingably and connecting them with each other. The top shaft holding portion 30 and the frame 20 of the barrel 2 are laminated so as to form the top thickened portion 22. The inside of the bottom thickened portion 22 is formed by the shaft holding portion 30 and a space.

Figure 4:
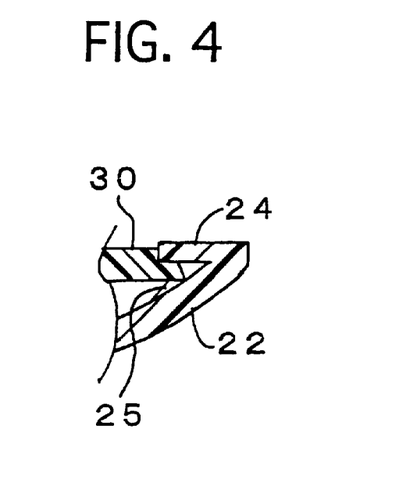
FIG. 4 is an enlarged cross-sectional view illustrating a portion of FIG. 3.

Each of the shaft holding portions 30, paired in the vertical direction, is engaged with and held by the frame 20. On the top thickened portion 22, there is formed an engagement convexity 23. The top shaft holding portion 30 is engaged with and positioned by the engagement convexity 23). Further, as illustrated in FIG. 4, which depicts an enlarged view of a portion of FIG. 3. on the bottom thickened portion 22, there are disposed a bottom plate 24, extending substantially parallel to the horizontal deflector plates 21, and a rib 25, facing with and projecting to the bottom plate 24. Thus, the end of the bottom shaft holding portion 30 is held between the bottom plate 24 and the rib 25. With this arrangement, the connector member 3 is fastened in the barrel 2, and the deflector member 1 is held swingably by the connector member 3

As is conventional, the mold is formed of halves, with each half having cavities. In use, the cavities in each half form a die, in which the parts are formed. The air-conditioning register according to the present invention may be manufactured by using a mold having four cavities. shown in FIG. 5D, and with a two-color injection molding machine as hereinafter described. Alternately, the air-conditioning register may be manufactured by using a mold comprising three separate mold halves, each one of the mold halves having one or more sets of cavities. In the following discussion, a manufacturing process using three mold halves is described.

First and Second Steps

Figure 5A:
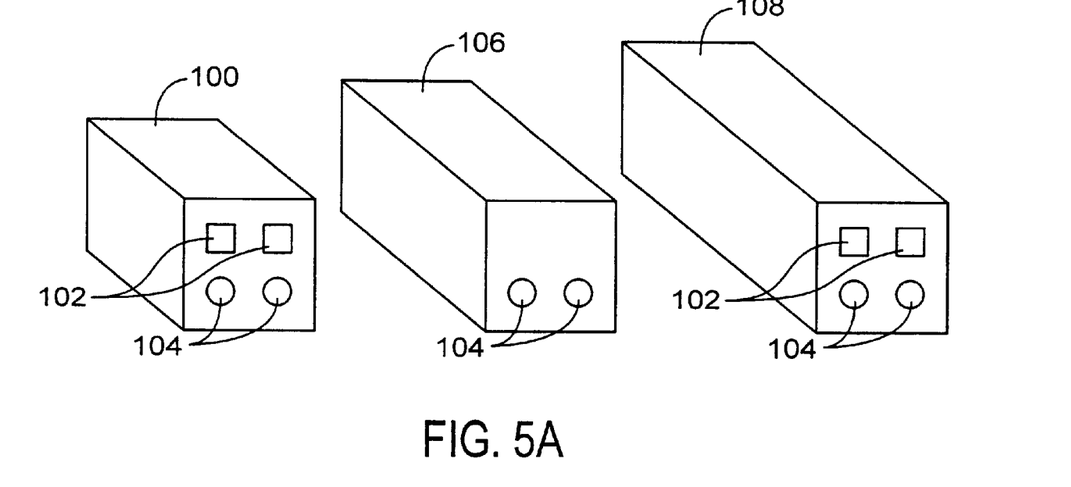
FIGS. 5A–5C are schematic perspective views of mold halves according to the present invention, illustrating the use of the mold halves.
Figure 5B:
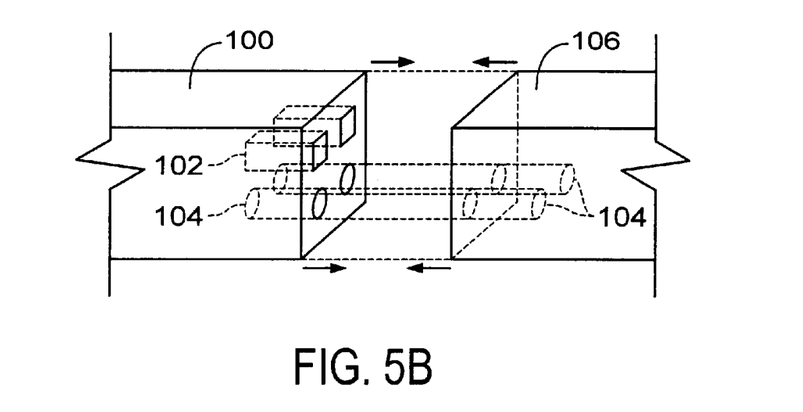
Figure 5C:
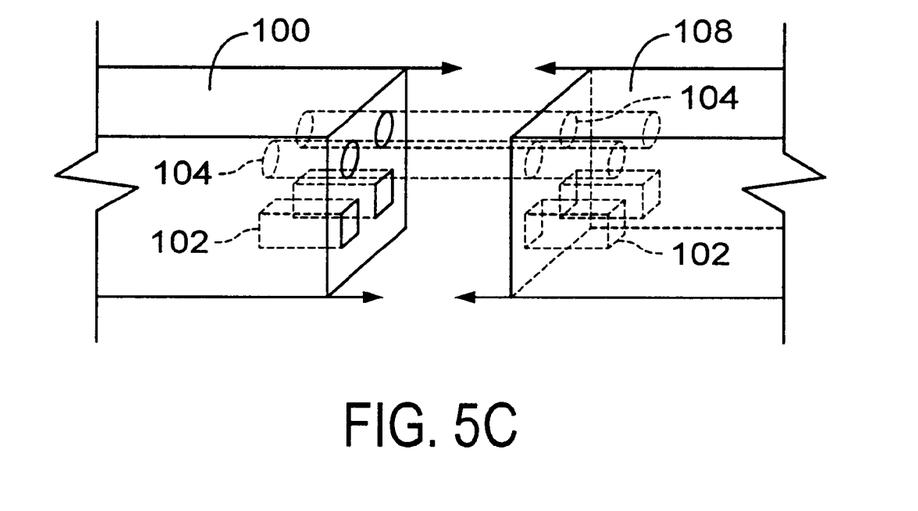
Figure 5D:
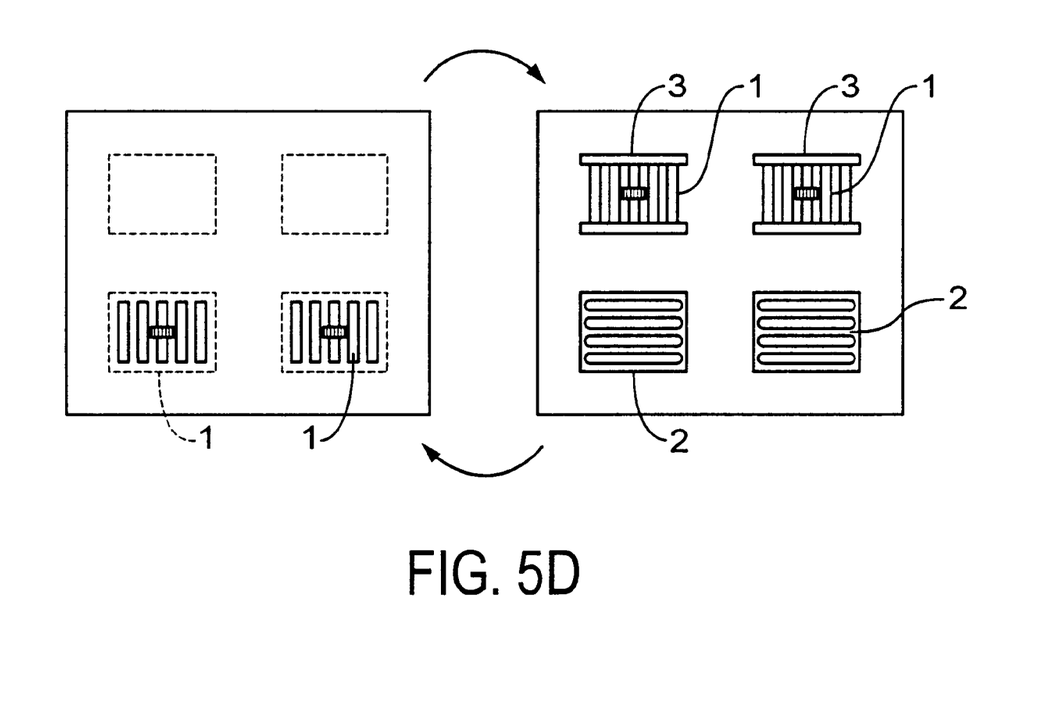
FIG. 5D is a schematic illustration of mold cavities according to the present invention.

First, the deflector members 1, shown in FIG. 5D, are formed of a first resin (e. g., an acrylonitrile-butadiene-styrene. "ABS"), having a relatively high melting point, by injecting the first resin into and molding it in two of the four cavities.

Figure 6:
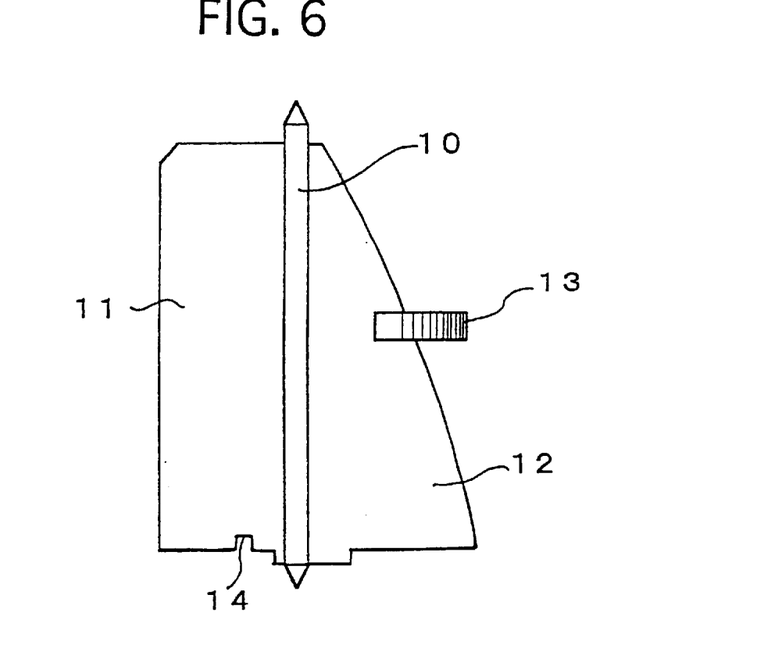
FIG. 6 is a side view illustrating a deflector member which is molded in a first step in the invention.

The deflector member 1 includes a plurality of the shafts 10, the rearward vertical deflector plates 11, each of which extends from each of the shafts 10 rearwardly, a plurality of the forward vertical deflector plates 12, each of which extends from each of the shafts 10 in the direction opposite to the rearward vertical plates 11*m,* and a knob 13, which projects from the central forward vertical deflector plate 12. A plurality of the shafts 10 are disposed at intervals in the horizontal direction. Each of the rearward vertical deflector plates 11 and the forward vertical deflector plates 12 were disposed in series so that they are substantially parallel with each other. Further, at the bottom surface of each of the rearward vertical deflector plates 11, there is formed a concavity 14. The concavities 14 are formed so as to be positioned substantially on the same line.

Next, while a plurality of the deflector members 1 are placed in one of the mold halves of the cavity, the mold half is inverted and the other mold half is replaced by a third mold half. Then, the connector members 3 are formed onto the deflector members 1 by using a second resin (e.g., PP) which has a lower melting point than that of the first resin, and which does not fuse with the first resin. Further, simultaneously therewith, by using the vacant two cavities, the barrels 2 were formed of the second resin.

Figure 7:
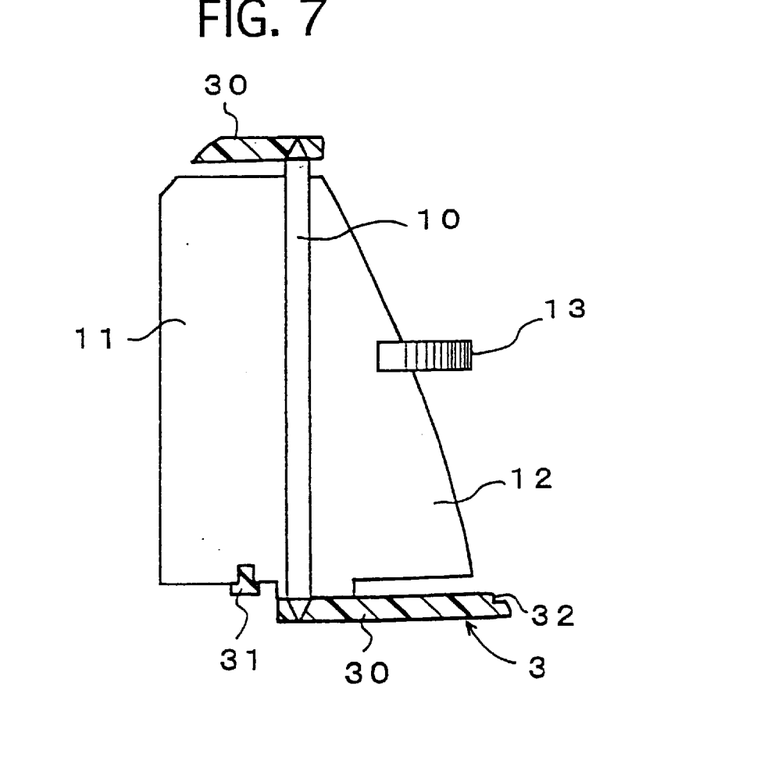
FIG. 7 is a cross-sectional view illustrating how a connector member is molded onto the deflector member according to the invention.

The connector member 3 includes the shaft holding portions 30, which are paired in the vertical direction, and the connector rod 31. As illustrated in FIG. 7, the opposite ends of the shafts 10 of the deflector member 1 are buried in and held by the shaft holding portions 30, which are paired in the vertical direction, and the connector rod 31 fills in the concavities 14 so as to connect and hold the rearward vertical deflector plates 11. Further, at the leading end of the bottom shaft holding portion 30, there is formed a step 32. The leading end of the step 32 is formed as a tapered configuration.

Since the ABS constituting the deflector member 1 does not fuse with the PP constituting the connector member 3, each of the shafts 10 is held rotatably by the shaft holding portions 30, and the rearward vertical deflector plates 11 are held synchronously and swingably by the connector rod 31.

Figure 8:
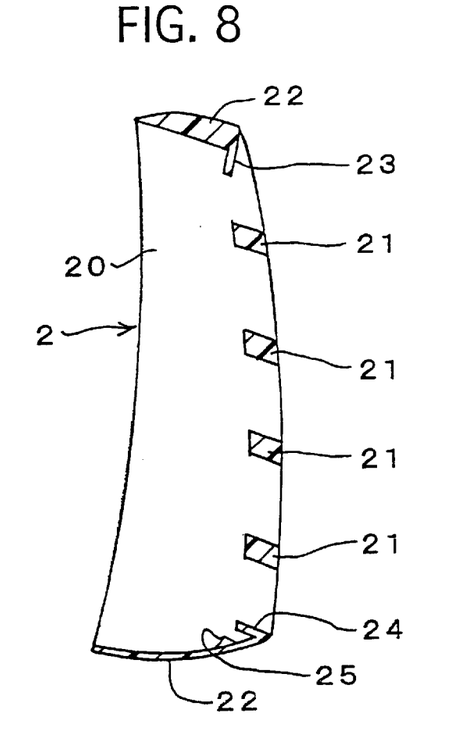
FIG. 8 is a cross-sectional view illustrating a barrel (i.e.. frame-shaped member), which is molded in a second step according to the invention.

As illustrated in FIG. 8, the barrel 2 includes a cylinder-shaped frame 20 and a plurality of the horizontal deflector plates 21 which are disposed in the barrel 20 at equal intervals in series substantially parallel with each other. On the top and bottom of the frame 20, there are formed the thickened portions 22. which are regarded as thick walls when viewed from the front. Further, on the top thickened portion 22. there is formed the engagement convexity 23. Furthermore, on the bottom thickened portion 22, there is disposed the bottom plate 24, which extends substantially parallel to the horizontal deflector plates 21, and the rib 25, which faces with and projects to the bottom plate 24.

Third Step

Figure 9:
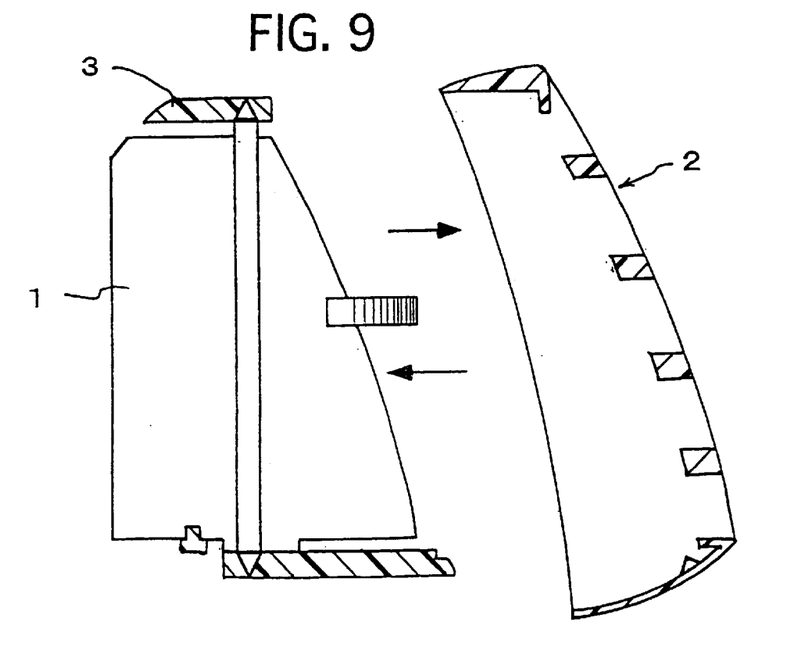
FIG. 9 is a sectional side view of the barrel and deflector members, illustrating a method of assembling the two components according to the invention.

Then, the deflector members 1, which are held by the connector members 3, are removed from the mold, and simultaneously the barrels 2 are removed from the mold. When removing the deflector members 1 and the barrels 2 from the mold, a pneumatic pressure is utilized. Due to the pneumatic pressure, the deflector members 1, which are held by the connector members 3, and the barrels 2 are pressurized so as to approach with each other as illustrated in FIG. 9. Thus, the deflector members 1, which are held by the connector members 3, register with the barrels 2, the top shaft holding portions 30 contact with the engagement convexities 23 to engage therewith, and the steps 32 of the bottom shaft holding portions 30 are engaged between the bottom plates 24 and the ribs 25, and are held therebetween. Accordingly, the deflector members 1, which are held by the connector members 3 in FIG. 9, are removed from the connector members 3, so that they are held by the barrels 2 as illustrated in FIG. 3.

This molding process is illustrated schematically in FIGS. 5A–C. FIG. 5A is a schematic perspective view of three mold halves used according to the present invention. A first mold half 100 is illustrated as having two types of cavities in FIG. 5A, schematically illustrated as a set of square cavities 102 and a set of circular cavities 104. A second mold half 106 is provided with a set of two circular cavities 104. A third mold half 108 is provided with square and circular cavities 102, 104 corresponding to those of the first mold half 100. It is understood that the cavities 102, 104, although depicted as square and circular in FIGS. 5A–C actually have molding surfaces that are contoured to form the parts of a register according to the present invention.

In the first step of the molding process according to the invention, illustrated in FIG. 5B, the first and second mold halves 100, 106 are clamped together one set of cooperating cavities of the first and second mold halves 100, 106 constituting a first die. An ABS resin, as described above, is injected into the first die, thereby forming the deflector members 1.

Following the formation of the deflector members 1, the first and second mold halves 100, 106 are unclamped. Next, as illustrated in FIG. 5C, the first mold half 100 is inverted, while the second mold half 106 is withdrawn and replaced by the third mold half 108. The first and third mold halves 100, 108 are then clamped, one set of cooperating cavities 102 of the first and third mold halves 100, 108 constituting a second die. The connector members 3 are formed of a polypropylene resin in the second die, as is described above. Simultaneously, the barrels 2 may be formed of polypropylene in another set of cavities 104 in the first and third mold halves 100, 108, which constitute a third die. Thus, the connector members 3 are formed directly on the deflector members 1, and do not weld to the deflector members 1. Finally, in the above-described third (assembly) step, the components are biased to move towards one another and engage one another by a pneumatic pressure.

In the thus obtained air-conditioning register, since the knob 13 is integral with the deflector member 1, it is not necessary to spend the additional man-hours that would otherwise be necessary to assemble a knob in a subsequent step. Further, since the thickened portions 22 are formed so that they arc divided between two parts, which are formed independently of each other, in the thickness-wise direction, the sink mark and the deformation are inhibited after molding. Accordingly, the register exhibits a high quality of appearance and is inhibited from improper operation resulting from the interference produced by a thickened portion.

Furthermore, since the barrel 2 itself is formed independently, the configurations of the deflector member I and the connector member 3 are not limited by the mold used for forming the barrel 2. Therefore, the degree of freedom in designing is upgraded. Moreover, the directivity of the blowing air is enhanced by enlarging the swinging angles of the rearward vertical deflector plates 11 and the forward vertical deflector plates 12. In addition. since the clearances at the holding portions are obviated, the unstableness and ricketiness of the device are avoided.

In the air-conditioning register, a plurality of the rearward vertical deflector plates 11 and the forward vertical plates 12 are swung synchronously in the horizontal direction by rotating the knob 13. Hence, when the barrel 2 is held swingably in the vertical direction by installing it to an air outlet of an instrument panel so as to dispose the horizontal deflector plates 21 horizontally, it is possible to make the direction of the air flow variable in the vertical direction by swinging the barrel 2, and it is also possible to make the direction of the air flow variable in the horizontal direction by rotating the knob 13.

Having now fully described the present invention, it will be apparent to one of ordinary skill in the art that many changes and modifications can be made thereto without departing from the spirit or scope of the present invention as set forth herein including the appended claims.

What is claimed is:

1. A process for manufacturing a register, employing a first mold half having a first cavity, and a second cavity, a second mold half having a third cavity and a third mold half having a fourth cavity and a fifth cavity, wherein the first cavity and the third cavity constitute a first die, the first cavity and the fourth cavity constitute a second die and the second cavity and the fifth cavity constitute a third die, comprising the steps of:

molding a deflector member made from a first resin in the first die after clamping the first mold half and the second mold half, the deflector member having a plurality of shafts and a plurality of first deflector plates extending from each of the shafts substantially parallel with each other;

molding a connector member made from a second resin that does not fuse with the first resin in the second die after clamping the first mold half and the third mold half and maintaining the deflector member in the first cavity, the connector member holding the shafts rotatably and connecting the first deflector plates swingably;

molding a frame-shaped member from a third resin in the third die, the frame-shaped member having a plurality of second deflector plates forming outlet openings, being substantially parallel with each other and crossing with the first deflector plates substantially perpendicularly; and assembling the deflector member having the connector member with the frame-shaped member.

2. The process according to claim 1, wherein the second resin and the third resin are an identical resin, and said frame-shaped member molding step is carried out simultaneously with the molding of the connector member.

3. The process according to claim 1, wherein a knob for operating the first deflector plates swingably is molded integrally with one of the first deflector plates simultaneously with the molding of the deflector member.

4. A register made in accordance with the process of claim 1, comprising:
- a deflector member having a plurality of shafts and a plurality of first deflector plates extending from each of the shafts substantially parallel with each other;
- a connector member having a top, a bottom, and a connector rod, the top and bottom holding the shafts rotatably, and the connector rod connecting the first deflector plates swingably; and
- a frame shaped member having a plurality of second deflector plates, a top and a bottom, the second deflector plates forming outlet openings, being substantially parallel with each other and crossing with the first deflector plates of said deflector member substantially perpendicularly with each other, the top engaging with the top of said connector member, and the bottom engaging with the bottom of said connector member.

5. The register according to claim 4 further comprising a knob disposed integrally with one of the first deflector plates of said deflector member for operating the first deflector plates of said connector member swingably.

* * * * *